United States Patent

[11] 3,596,164

[72] Inventors Donald L. Bise
Tustin;
Ronald J. Surprenant, Anaheim, both of, Calif.

[21] Appl. No. 858,637
[22] Filed Sept. 17, 1969
[45] Patented July 27, 1971
[73] Assignee The Okonite Company
Ramsey, N.J.

[54] TELEPHONE CONTROL CIRCUIT
5 Claims, 1 Drawing Fig.

[52] U.S. Cl. .......... 320/9, 307/39, 307/44, 320/5, 323/4
[51] Int. Cl. .......... H02j 9/00
[50] Field of Search .......... 320/5, 9, 10, 11, 13, 14; 307/32, 34, 35, 39, 41, 44, 46, 56, 64—68, 70, 80, 81, 85, 99, 253, 254; 323/4

[56] References Cited

UNITED STATES PATENTS

| | | | |
|---|---|---|---|
| 3,188,398 | 6/1965 | Busala .......... | 307/32 |
| 3,375,426 | 3/1968 | Dolamore .......... | 320/39 |
| 3,387,198 | 6/1968 | Johnson et al. .......... | 320/14 |
| 3,445,744 | 5/1969 | Henderson et al. .......... | 320/40 |
| 3,508,139 | 4/1970 | Rummel .......... | 321/18 |

*Primary Examiner*—J. D. Miller
*Assistant Examiner*—John M. Gunther
*Attorney*—Walter J. Jagmin

ABSTRACT: A control circuit for use at a subscriber station end signal converter having a high impedance constant current generator for producing voice transmission direct current and for controlling operation of other components of the signal converter. The control circuit also includes a trickle charge circuit for charging a battery of the subscriber station end signal converter, the control circuit allowing operation of the trickle charge circuit only during periods of nonoperation of the telephone set at the subscriber station.

PATENTED JUL 27 1971
3,596,164
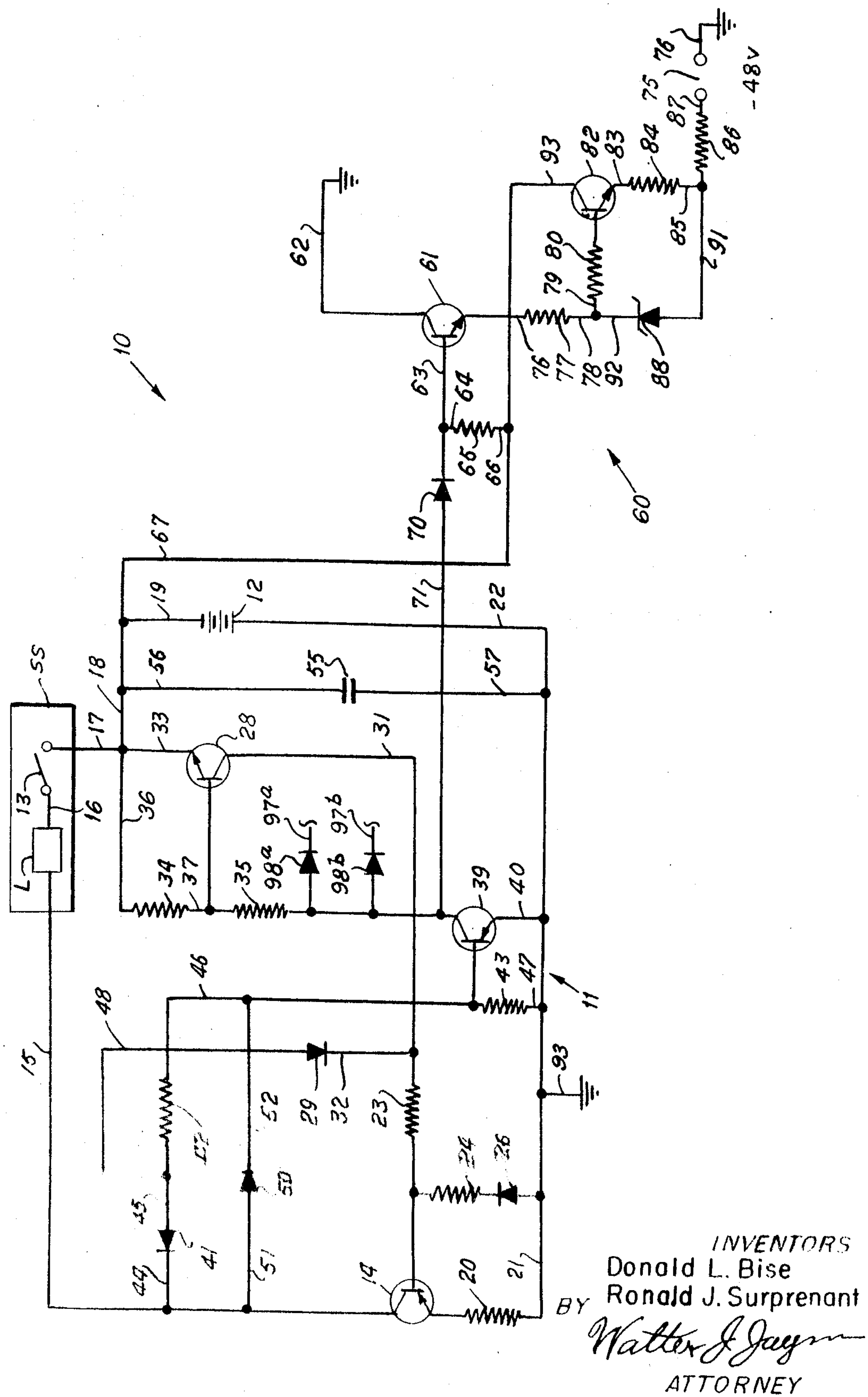
INVENTORS
Donald L. Bise
Ronald J. Surprenant
BY Walter J. Jagmin
ATTORNEY

TELEPHONE CONTROL CIRCUIT

This invention relates to a control circuit and more particularly to a control circuit for a telephone subscriber station end signal converter.

An object of this invention is to provide a new and improved control circuit for producing a high impedance constant current for use in voice transmission which operates automatically when a telephone set is placed in use.

Another object is to provide a current control circuit of the type described having means for controlling operation of other circuits of the converter responsive to the operation of the constant current generator.

Another object is to provide a control circuit having a charging circuit for trickle charging a battery of the converter and for preventing operation of the charging circuit during the operation of the constant current generator.

Still another object is to provide a control circuit of the type described wherein trickle charger is powered by electric current of a simplex path of a subscriber loop system to which the converter subscriber station is connected.

Still another object is to provide a control circuit of the type described which does not require the use of transformers, and therefore is of small size and weight and minimizes insertion loss of voice frequencies.

Additional objects and advantages of the invention will be readily apparent from the reading of the following description of a device constructed in accordance with the invention, and reference to the accompanying drawing thereof, wherein the schematic circuit of the control circuit is illustrated.

Referring now to the single FIGURE of the drawing, the control circuit 10 embodying the invention includes a constant current generator circuit 11 which is connectable across a source of voltage, such as a battery 12, when a switch 13 of a telephone set at the subscriber station SS is closed, as when the telephone handset is moved to off-hook position.

The current generator circuit includes a transistor 14 whose collector is connected to the negative side of the battery, whenever the switch 13 is closed, by the conductors 15, 16, 17, 18 and 19 and whose emitter is connected to the positive side of the battery through a resistance 20 and the conductors 21 and 22.

The base of the transistor 14 is connected to the common connection of the resistances 23 and 24. One side of the resistance 24 is connected to the positive side of the battery 12 through a diode 26 and the conductors 21 and 22.

A transistor 28 of the current generator circuit 11, which controls the operation of the transistor 14, has its collector connected to the common connection of the resistance 23 and one side of a diode 29 by the conductors 31 and 32. The base of the transistor 28 is connected to the common connection of a pair of resistances 34 and 35 which are connected in series between the conductor 18 and the conductor 21, and therefore across the battery 12, by means of the conductors 36, 37 and 38, the emitter-collector circuit of a transistor 39 and a conductor 40. Since the base of the normally nonconductive transistor 28 is connected to the common connection of the resistances 34 and 35, the emitter-collector circuit of the transistor 28 will be rendered conductive whenever the emitter-collector circuit of the transistor 39 is rendered conductive and causes a less negative potential to be applied to the base of the transistor 28.

The base of the normally nonconductive transistor 39 is connected to a control circuit which renders its emitter-collector circuit conductive when the switch 13 is closed and which includes a diode 41 and a pair of resistances 42 and 43 connected in series between the conductors 15 and 21, and therefore across the battery, when the switch 13 is closed, by the conductors 44, 45, 46 and 47.

As a result, whenever the switch 13 is closed, the bias applied to the base of the transistor 39 renders it conductive and it in turn renders the transistor 28 conductive.

One side of the diode 29 is connected to the common connection of the diode 41 and the resistance 42 by a conductor 48 for a purpose to be described below.

In order to insure that the transistor 39 is rendered nonconductive upon a subsequent opening of the switch 13, a diode 50 is connected between the conductors 15 and 21 by means of the conductors 51, 52 and 46, the resistance 43 and the conductor 47.

A capacitor 55 is connected across the conductors 18 and 21 by conductors 56 and 57 to reduce current surges upon the closing and opening of the switch 13.

In use, when the switch 13 is open the three transistors 14, 28 and 39 are all nonconductive. When the handset at the subscriber station is moved to off-hook position, the switch 13 closes and a biasing potential is applied to the base of the transistor 39 as current will then flow through the voltage divider circuit which includes the diode 41 and the resistances 42 and 43.

As the emitter-collector circuit of the transistor 39 is rendered conductive, a biasing potential is then applied to the base of the transistor 28 since the resistances 34, 35 and the emitter-collector circuit of the transistor 39 now serve as a voltage divider network and current flows therethrough. As soon as the emitter collector circuit of the transistor 28 is rendered conductive, the diode 29 conducts since it is then connected across the battery through the conductors 18 and 33, the emitter-collector circuit of the transistor 28, the conductors 31 and 32, the resistance 42, the conductor 46, the resistance 43 and the conductors 47, 21 and 22. As a result, the diode 41 is reversely biased and the current flow through the diode 29 provides the biasing potential to the base of the transistor 39 which keeps it conductive as long as the switch 13 is held closed.

The three transistors now remain conductive as long as the switch 13 is closed and the transistor 14 provides a constant current, for example, 20 milliamperes to the subscriber station which serves as the transmitter current for the subscriber station. The transistor 28 and the resistances 23 and 24 control the conductivity of the transistor 14 to maintain substantially constant current flow through the emitter-collector circuit of the transistor 14 regardless of any variations in the voltage of the battery 12. The diode 26 provides temperature compensation to the circuit including the emitter-collector circuit of the transistor 14 so that the current flow will remain substantially constant over normal ranges of ambient temperature.

The high, alternating current, impedance at the common connection of the emitter of the transistor 14 and the resistance 20 prevents shunting of voice signals from the subscriber station to ground through the transistor 14.

When the switch is again opened, as when the handset is replaced at the telephone set of the subscriber station, current flow through the diode 50 immediately causes the current to the base of the transistor 39 to decrease, rendering it nonconductive. This in turn renders transistor 28 nonconductive which in turn renders transistor 14 nonconductive restoring the circuit to its on-hook status.

It will thus be seen that the current generator circuit 11 provides a constant direct current transmitter current to the subscriber station whenever the switch 13 is closed and that it is rendered inoperative as soon as the switch 13 is opened.

It will be apparent that the common connection of the resistance 35 and the collector of the transistor 39, when the transistor 39 is rendered conductive, may be used as a control signal for other functional circuits of the subscriber station end signal converter, as, for example, the illustrated trickle charger circuit 60. The charger circuit includes a control transistor 61 whose emitter is connected to ground by a conductor 62 and whose base is connected to the negative side of the battery 12 through the conductors 63 and 64, a resistance 65 and the conductors 66, 67 and 19.

It will be apparent that when the transistor 39 is nonconductive, a biasing potential applied across the base-emitter circuit of the transistor circuit 61 renders it conductive and is maintained conductive as long as this negative bias is applied to the base of the transistor 61.

The potential applied to the base of the transistor 61 is rendered less negative, effectively ground potential, to render the transistor 61 nonconductive whenever the transistor 39 is conductive, by a diode 70 which is connected between the common connection of the collector of the transistor 39 and the resistance 33 by the conductors 63 and 71.

The emitter-collector circuit of the transistor 61 is connected across an input circuit 75 of negative voltage as for example, a simplex path of the telephone system, one side of which is connected to ground by a conductor 76, by the conductors 62 and 76, a resistance 77, conductors 78 and 79, a resistance 80, the base-emitter circuit of a charging transistor 82, a conductor 83, the resistance 84, the conductor 85 the cable resistance 86 and the conductor 85. A Zener diode 88 is connected between the negative side of the input circuit 75 and the common connection of the resistances 77 and 80 by the conductor 87, a resistance 86 and the conductors 91 and 92 to provide a constant voltage across the resistance 84 which causes the emitter-collector current of the transistor to be substantially constant which is independent of the cable resistance 86 and the input voltage of the input circuit 75. The diode 88 protects the transistor 82 against transient voltages as long as the transistor 61 is conductive, a biasing potential is applied to the base of the transistor 82 which renders its emitter-collector circuit conductive since it is connected across the input circuit 75 through the conductor 87, the resistance 86, the conductor 85, a resistance 84, the conductors 83, 93, 67 and 19, the battery 12, and the conductors 22 and 98, ground and the conductor 76. As a result, a constant trickle charge current is supplied to the battery 12 during the periods of time when the transistor 39 is nonconductive, and the transistors 61 and 82 are conductive and that the charging circuit 60 is rendered inoperative as soon as the switch hook is opened. Thus the charging circuit does not interfere with the operation of the subscriber station end signal converter when the hand set is off-hook and voice or supervisory signals, such as rotary dial signals, are being transmitted.

It will be apparent that other circuits of the subscriber station end signal converter can similarly be controlled to render them either operative or inoperative when the hook switch 13 is closed or opened, by connecting control transistors of such other circuits to one or more terminals **97*a*, 97*b* and so on, which are connected to the common connection of the emitter-collector circuit of the transistor 39 and the resistance 36 through diodes, such as the diodes 98*a* and 98*b***.

It will now be apparent that a new and improved control circuit for use in a subscriber station end signal converter has been illustrated and described which uses no bulky transformers, which has a constant current generator which provides a high impedance constant current source of transmitter current for a subscriber station, a trickle charge circuit for charging a battery at a constant rate independent of cable resistances and charging voltage, and control means for controlling the operation of other circuits of the converter such as the trickle charge circuit.

It will now be seen that the transistor 39 may be regarded as a switch transistor for rendering the control transistor 28 operative and that the control transistor 28 in turn controls the conductivity of the transistor 14 and thus provide a constant direct transmitter current to a load, such as the telephone line and telephone set of a subscriber station SS.

The foregoing description of the invention is explanatory only, and changes in the details of the construction illustrated may be made by those skilled in the art, within the scope of the appended claims, without departing from the spirit of the invention.

What I claim and desire to be secured by Letters Patent is:

1. A control circuit including: an input circuit of direct voltage; switch means; a constant current generator circuit for energizing a load, said generator circuit including a first transistor having its emitter-collector circuit connectable by said switch means in series with a load across said input circuit; a switch transistor; voltage divider means connectable across said input circuit by said switch means providing a biasing potential for said switch transistor for rendering said switch transistor conductive when said switch means is closed; a control transistor; a first means operatively associated with said switch and control transistors for causing said control transistor to be conductive when said switch transistor is conductive; and second means operatively associated with said control transistor and said first transistor for controlling the conductivity of said first transistor and causing causing said first transistor to be conductive when said control transistor is conductive.

2. The control circuit of claim 1, and third means operatively associated with said switch transistor for providing a control voltage when said switch transistor is conductive.

3. The control circuit of claim 2, and a battery connected across said input circuit for energizing said input circuit with direct current; a second input circuit of direct current; and a charging circuit controlled by said control voltage of said third means for charging said battery when said switch transistor is nonconductive and preventing operation of said charging circuit when said switch transistor is conductive.

4. The control circuit of claim 3, wherein said charging circuit includes a charging transistor having its emitter-collector circuit connecting said battery across said second input circuit; and a second transistor for controlling the conductivity of said charging transistor said second transistor being rendered inoperative by said control voltage provided by said control means when said switch transistor is conductive to cause said charging transistor to be nonconductive.

5. A control circuit including: an input circuit of direct voltage; switch means; a constant current generator circuit for energizing a load, said generator circuit including a first transistor having its emitter-collector circuit connectable by said switch means in series with a load across said input circuit; a switch transistor; a first voltage divider means connectable across said input circuit by said switch means and operatively associated with said switch transistor for rendering the emitter-collector circuit of said switch transistor conductive when said switch means is closed; a second voltage divider means connected in series with the emitter-collector circuit of said switch transistor across said input circuit; a control transistor; said second voltage divider means being operatively associated with said control transistor for causing the emitter-collector circuit of said control transistor to be rendered conductive when said switch transistor is rendered conductive; a third voltage divider means connected in series with the emitter-collector circuit of said control transistor for providing a biasing potential to said first transistor for controlling the conductivity of the emitter-collector circuit of said first transistor.